Feb. 28, 1961 P. M. BOURDON 2,972,966
APPARATUS FOR AUTOMATICALLY CONTROLLING THE POSITION
OF A VEHICLE MOVABLE MEMBER WITH RELATION
TO TRACK MEANS THEREFOR
Filed Jan. 29, 1957 5 Sheets-Sheet 1
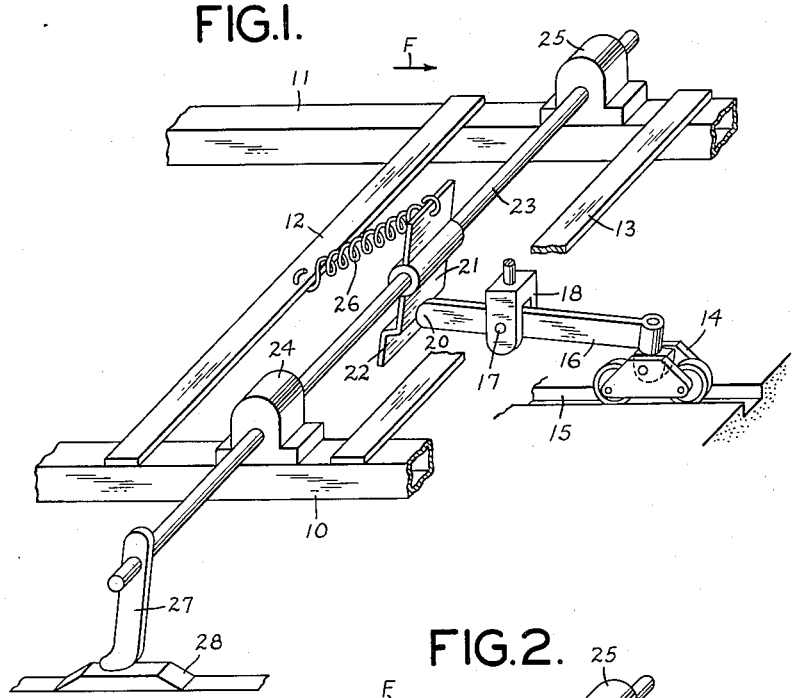
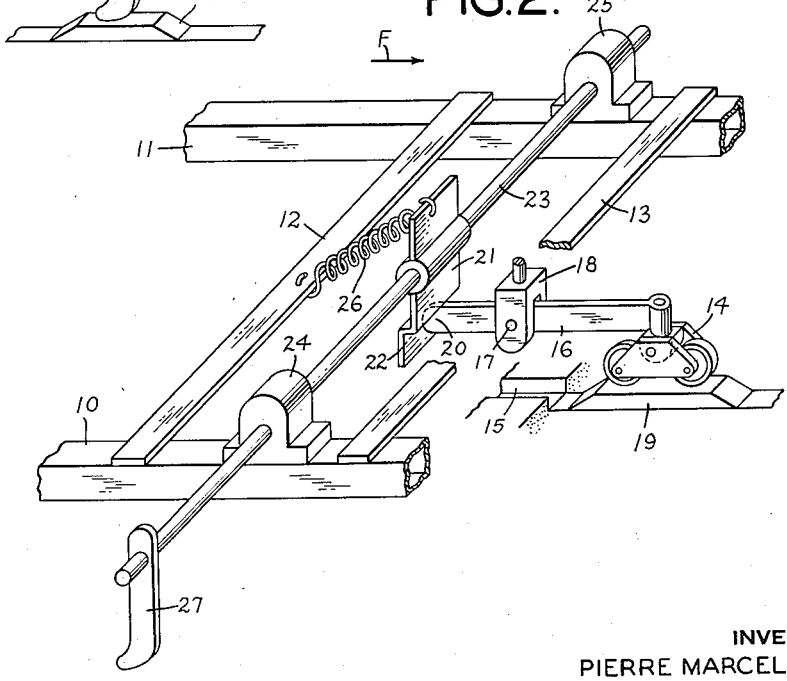
INVENTOR
PIERRE MARCEL BOURDON
BY
HIS ATTORNEYS

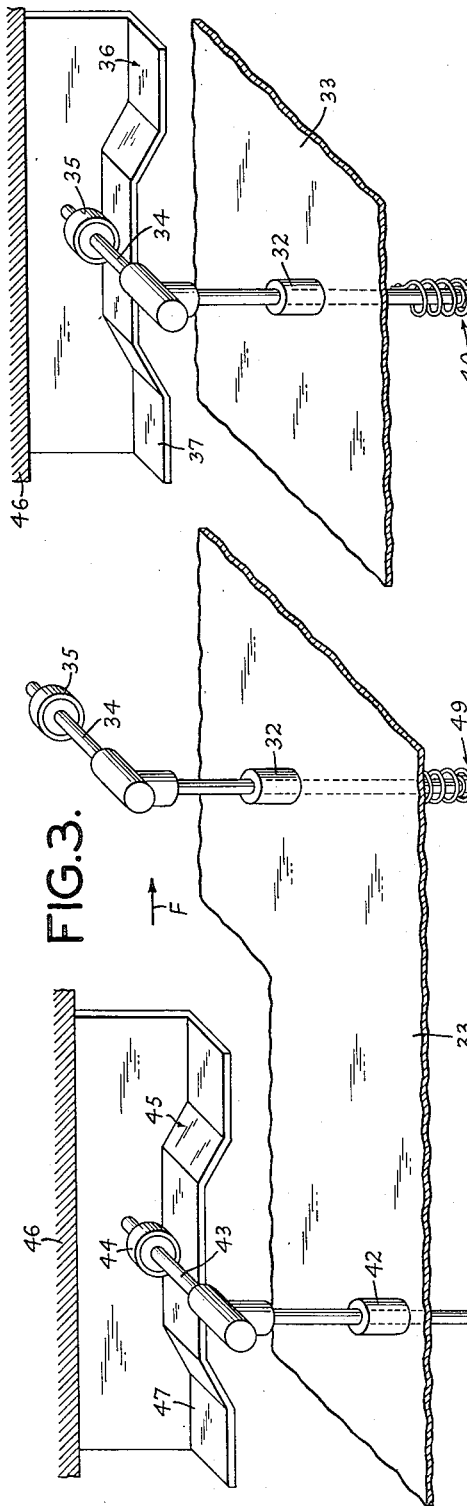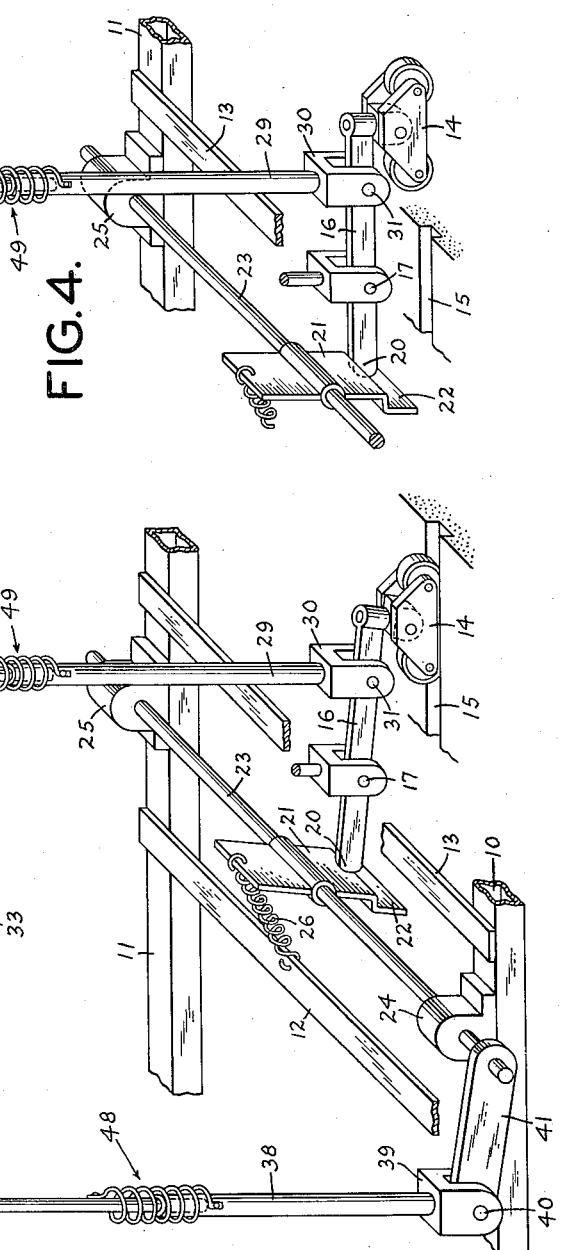

Feb. 28, 1961 P. M. BOURDON 2,972,966
APPARATUS FOR AUTOMATICALLY CONTROLLING THE POSITION
OF A VEHICLE MOVABLE MEMBER WITH RELATION
TO TRACK MEANS THEREFOR
Filed Jan. 29, 1957 5 Sheets-Sheet 3

INVENTOR
PIERRE MARCEL BOURDON
BY
Brumbaugh, Free, Graves & Donohue
HIS ATTORNEYS Feb. 28, 1961 P. M. BOURDON 2,972,966
APPARATUS FOR AUTOMATICALLY CONTROLLING THE POSITION
OF A VEHICLE MOVABLE MEMBER WITH RELATION
TO TRACK MEANS THEREFOR
Filed Jan. 29, 1957 5 Sheets-Sheet 4
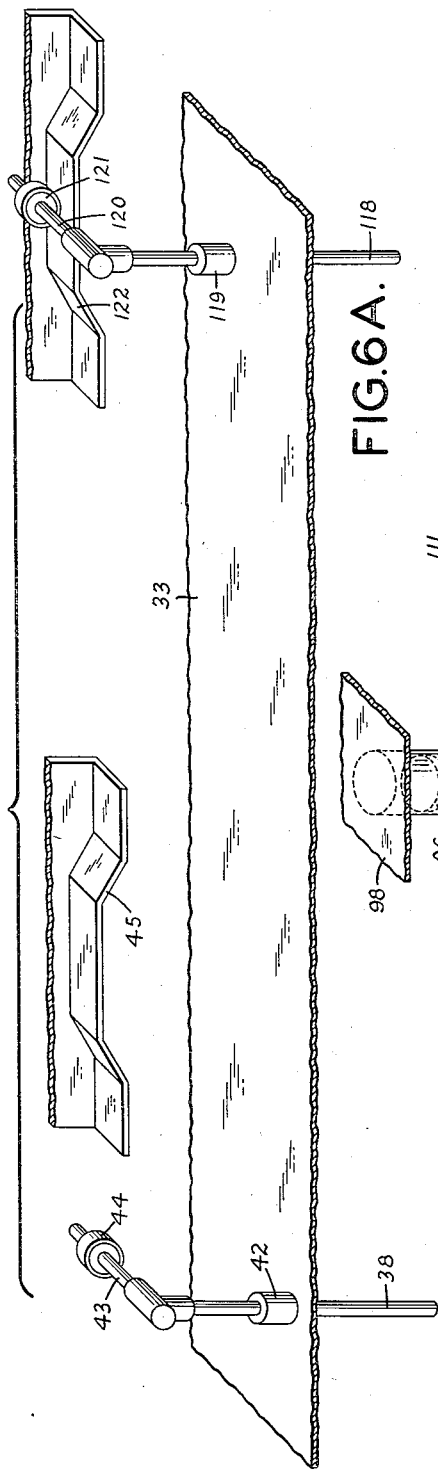
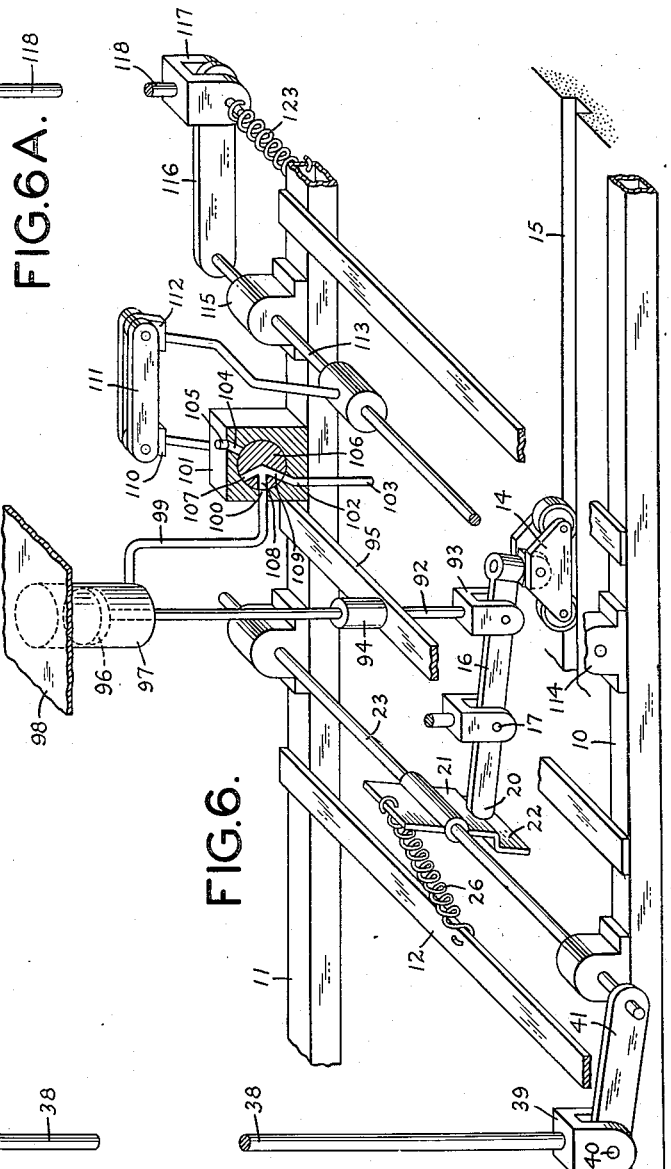
INVENTOR
PIERRE MARCEL BOURDON
BY
Brumbaugh, Free, Graves & Donohue
HIS ATTORNEYS United States Patent Office 2,972,966
Patented Feb. 28, 1961

2,972,966

APPARATUS FOR AUTOMATICALLY CONTROLLING THE POSITION OF A VEHICLE MOVABLE MEMBER WITH RELATION TO TRACK MEANS THEREFOR

Pierre Marcel Bourdon, Paris, France, assignor to Compagnie Generale des Etablissements Michelin (Robert Puiseux & Cie), Clermont-Ferrand, France, a company of France Filed Jan. 29, 1957, Ser. No. 636,973

Claims priority, application France Feb. 3, 1956

28 Claims. (Cl. 104—247)

The present invention relates to vehicles incorporating a control or other member which is movable into or out of operative relation with a fixed track, and more particularly to novel mechanism for automatically controlling the position of the movable member as required for effective and safe operation of the vehicle.

Several different types of vehicles are known which utilize a control or other member adapted to be moved into and out of operative relation with a fixed track traversing a route over which the vehicle is required to travel. For example, in electric trolley car systems utilizing both overhead and underground conductor means over different parts of a route, the so-called "plow" of a trolley car must be moved into or out of operative relation to the underground conductor means at each location along the route where a transfer from one form of feed conductor means to the other is to be made.

A similar problem arises in connection with vehicles that are adapted to be steered manually over part of a route (outside of the centers of population, for example), but which are required to be steered automatically over other parts of the route (in the center of a city, for example). Vehicles of this type, in which automatic steering is effected by means including a movable follower member adapted to cooperate with track means on the ground are disclosed in the applicant's copending applications Serial No. 583,817, now Patent No. 2,925,875, for "Automatic Guiding of Road Vehicles," and Serial No. 583,798 for "Safety Device for Automatic Guiding of Road Vehicles," both filed May 9, 1956. In such vehicles, the follower member must be moved into cooperating relation with the track means when automatic operation is required and, conversely, must be moved out of cooperating relation with the track means when steering is to be effected manually.

Usually, it is left to the operator to transfer the movable member manually from one position to the other as required. However, this is not satisfactory because if the operator inadvertently forgets, as not infrequently happens, delays in service and possible damage to the vehicle may ensue.

It is an object of the invention, accordingly, to provide novel and highly effective mechanism for automatically controlling the position of a movable member on a vehicle in relation to track means therefor, as required for proper operation of the vehicle.

According to the invention, actuator means are positioned along the route at each location where the position of the movable member in relation to the track means should be altered. Each vehicle traversing the route likewise is provided with actuatable means which is adapted to be operated automatically by the actuator means as the vehicle arrives at the location of the latter to cause the movable member to move from its then position (in operative or inoperative relation to the track means) to the other position (in inoperative or operative relation, respectively, to the track means) of which it is capable.

In one embodiment, the movable member is adapted to be raised by first ramp means suitably shaped and positioned for this purpose, latch means being provided for locking the movable member releasably in the raised position. Second ramp means are provided which are adapted to cooperate with actuatable means on the vehicle to release the latch means to permit the movable member to return to its initial position. If desired, power means responsive to the actuator means may be used for effecting either or both of the desired movements of the movable member in relation to the track means. Also, if esthetic or other considerations make the use of mechanical actuator members undesirable, light sources may be used for this purpose in cooperation with photoelectric means on the vehicle.

Where vehicle travel in opposite directions is envisaged, the invention also contemplates the provision of distinctive actuator means for each direction of travel, with corresponding distinctive actuatable means on the vehicle.

For a better understanding of the invention reference is made to the following detailed description of several representative embodiments thereof, taken in conjunction with the accompanying drawings in which:

Figs. 1 and 2 are views in perspective of apparatus constructed according to the invention showing the movable member in its lowered and raised positions, respectively, relatively to the track means;

Figs. 3 and 4 are also perspective views similar to Figs. 1 and 2 of another embodiment of the invention;

Figs. 6 and 6A are schematic diagrams of a further embodiment utilizing pneumatic power means to position the movable member.

Figure 5A:
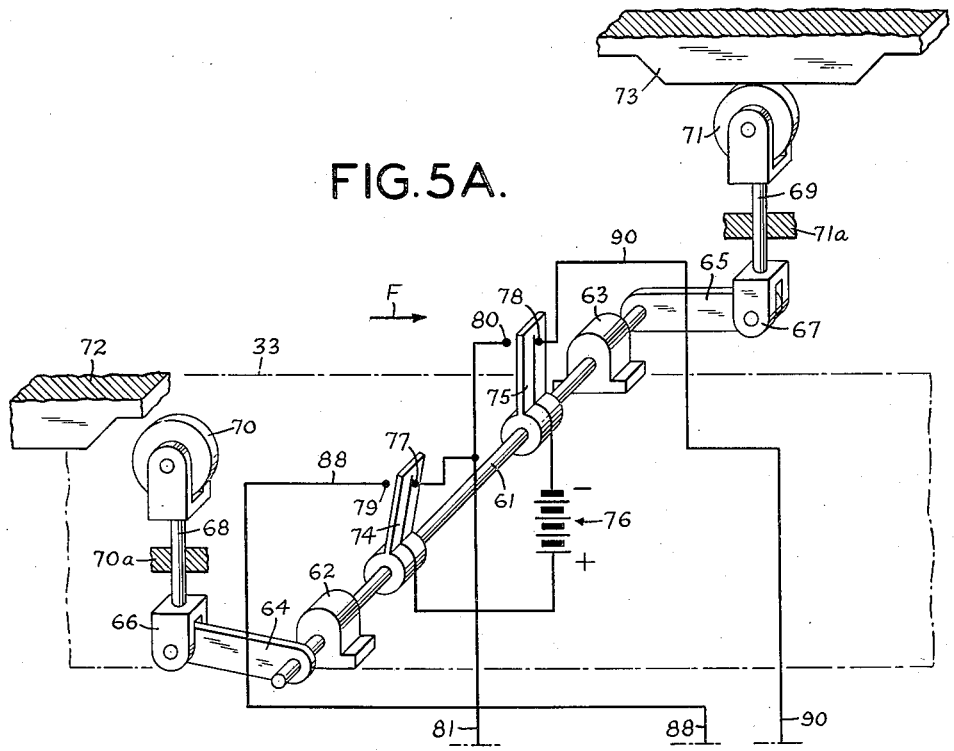
Figs. 5 and 5A illustrate schematically another modification in which electric power means is used to position the movable member.

While the invention may be applied to vehicles of different types, as indicated above, it will be described herein, for purposes of illustration, in connection with automatically guided vehicles of the type disclosed in the aforementioned copending applications Serial Nos. 583,798 and 583,817. Since the vehicle forms no part of the invention, only such details thereof are disclosed herein as are necessary for a clear understanding of the present invention.

Referring now to Figs. 1 and 2, 10 and 11 are the parallel side members of a vehicle (not shown) to which longitudinally spaced apart cross members 12 and 13 are secured. The vehicle is assumed to be travelling in the direction designated by the arrow F. Automatic steering of the vehicle is effected by carriage or truck means 14 which is adapted to ride in a groove 15 formed in the ground. The carriage 14 is supported on a bar 16 which is adapted to pivot about a horizontal pin 17 mounted in a yoke 18 secured to the cross member 13 in the manner described in the above-identified copending applications. As also described in those applications, the yoke 18 transmits the movement of the carriage 14 to the vehicle steering wheels (not shown) so that the vehicle follows a path determined by the groove 15. Thus, the carriage 14 is in the automatic steering position in Fig. 1.

As above stated, it is contemplated that the vehicle will be steered automatically only in the center of a city, for example, and that manual steering will be used whenever the vehicle is travelling outside of the centers of population. Accordingly, means must be provided for raising and lowering the carriage with respect to the roadway when steering is to be effected manually and automatically, respectively. The invention provides means for accomplishing this automatically, as described in detail below.

Raising the carriage 14 when steering is to be done manually is effected by a raised ramp 19 disposed in line with the guiding groove 15. As the carriage 14 rides up the ramp 19, it raises the end of the bar 16 to which it is attached. The other end 20 of the bar 16 is simultaneously lowered and is retained releasably in this position by a latch member 21 having a stepped detent portion 22 for this purpose. The latch member 21 is mounted on a shaft 23 journalled in bearings 24 and 25 secured on the side members 10 and 11, respectively, and it is maintained engaged with the end 20 of the bar 16 by a biasing spring 26 having one end secured to the cross member 12.

To lower the carriage 14 when automatic steering is to be resumed, the shaft 23 is provided at one end with a lever arm 27 which is adapted to be actuated by a suitably shaped ramp 28 (Fig. 1) located at a suitable place along the route of the vehicle. As the end of the lever arm 27 rides up the ramp 28, it causes the shaft 23 to turn clockwise so that the end 20 of the arm 16 slips out of the stepped detent portion 22 of the latch member 21. This allows the carriage 14 to drop of its own weight into the groove 15, which is preferably widened at this point to facilitate entry of the carriage 14 into the groove 15.

Instead of actuating the mechanism by ramps 19 and 28 (Fig. 1) positioned on the ground, which may interfere with the vehicles travelling along the route, it is possible to use actuators disposed above the vehicle as in Figs. 3 and 4. Thus, raising of the carriage 14 from the lowered position may be effected by a vertical rod 29 having a lower forked end 30 pivotally connected to the bar 16 near the carriage 14 by a pin 31. The rod 29 is slidably mounted in guides 32 in the floor (not shown) and in the roof 33 of the vehicle. Secured at the upper end of the rod 29 is a transversely extending arm 34 carrying a roller 35 adapted to ride over a stationary ramp 36 (Fig. 4).

The ramp 36 lies in the path over which the roller 35 is adapted to pass and it is preferably positioned at a height such that normally its lower part 37 is lower than the bottom surface of the roller 35. If the guided run is effected in a tunnel, the ramp 36 is preferably secured to the roof of the tunnel. Alternatively, if the vehicle is a trolley bus travelling in the open air, the ramp 36 may be secured to one of the posts from which the power cables for energizing the bus are suspended.

For lowering the carriage 14 from the raised position, a vertical rod 38 (Fig. 3) is provided. The rod 38 has a forked lower end 39 pivotally secured by a pin 40 to the end of an arm 41 fastened on an end of the shaft 23 and it is slidable in guides 42 provided in the floor (not shown) and roof 33 of the vehicle. At the upper end of the rod 38 is secured a transversely extending arm 43 carrying a roller 44 at the end thereof. The roller 44 is adapted to ride on a ramp 45 which is similar to the ramp 36 and is fastened to a support 46 in the same manner as the latter. The ramp 45 is disposed in the path of the roller 44 and at a height such that its lower surface 47 is lower than the bottom of the roller 44.

The rollers 35 and 44 are preferably disposed on opposite sides of the longitudinal axis of the vehicle. Also, the rods 29 and 38 should preferably be resiliently extensible so as to enable a greater stroke to be imparted to the rolelrs 35 and 44 than is required for proper movement of the arm 41 and the bar 16. For example, the rods 38 and 29 each may be made of two telescoping parts coupled by tension springs 48 and 49, respectively, strong enough to pull up the arm 41 and the bar 16 whenever the rollers 44 and 35, respectively, are lifted. In this fashion, it is possible to take into account the inevitable variations in the heights of the different vehicles that are required to travel over the route, differences which may depend, for example, on the different loads carried by the respective vehicles.

It will be understood that the ramps 36 and 45 in cooperation with the rollers 35 and 44, respectively, will serve to raise and lower, respectively, the carriage 14 depending upon whether steering is to be accomplished manually or automatically, respectively.

If desired, power means may be employed for controlling the positioning of the guide carriage or truck of the vehicle, as shown in Figs. 5, 5A, 6 and 6A.

Figure 5:
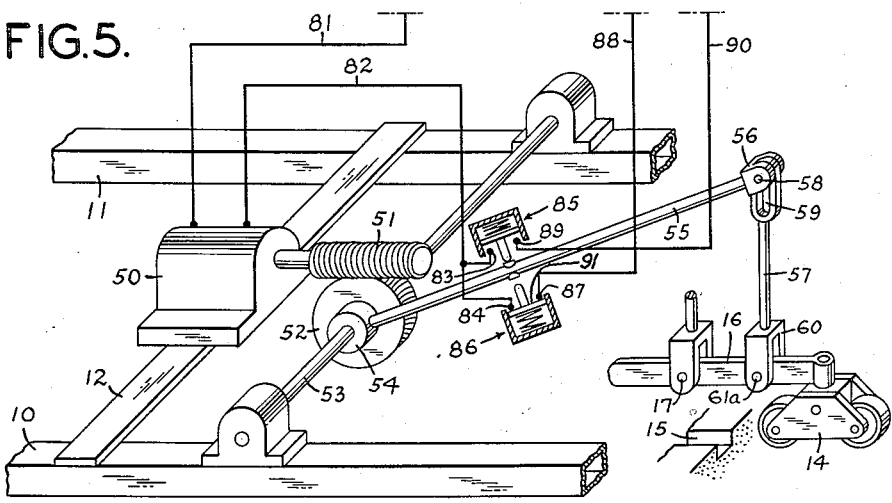

In the embodiment shown in Figs. 5 and 5A, the carriage 14 is adapted to be raised or lowered by an electric motor 50 secured to the cross member 12. The motor 50 has a horizontal shaft (Fig. 5) on which is keyed or otherwise secured a worm 51 engaging a spiral gear 52 mounted on a shaft 53 journalled in bearings secured on the vehicle frame. The gearing 51, 52 forms a speed reducer such that for one revolution of the shaft of the motor 50, the gear 52 is rotated only a fraction of a revolution. The gear 52 has a hub 54 to which is secured one end of a radially extending lever 55. The lever 55 is capable of moving in a vertical plane between two extreme angular positions when the gear 52 turns a fraction of a revolution under the action of the worm 51.

The lever 55 has a forked outer end 56 which is coupled to the upper end of a rod 57 by a pin 58 extending through an elongated slot 59. The rod 57 has a forked lower end 60 which is pivotally mounted on the bar 16 near the carriage 14 by a pin 61a.

The pin 58 and slot 59 function as a lost motion mechanism enabling some slight movement of the carriage 14 when the lever 55 is in its lowermost position, within the limits imposed by the length of the slot 59, as required to enable it to follow slight differences in the ground level. While in Fig. 5, the slot 59 is placed at the upper end of the connecting rod, it could, of course, just as well be placed at the lower end. For rotation of the motor 50 in one direction, the lever 55 lowers the carriage 14 to the ground and vice-versa.

On the roof 33 of the vehicle (shown in dot-dash lines in Fig. 5A) is disposed a transverse shaft 61 which is adapted to rotate in spaced bearings 62 and 63. On the opposite ends of the shaft 61 are keyed or otherwise secured oppositely directed lever arms 64 and 65, respectively. At the ends of the lever arms 64 and 65 are pivotally mounted the forked lower ends 66 and 67, respectively, of a pair of actuator rods 68 and 69, respectively, which are maintained vertical by means of guides 70a and 71a respectively. The guides 70a and 71a may be connected by any suitable means to the roof 33 of the vehicle, for example, by a casing (not shown) which serves to protect the mechanism just described. At the upper ends of the rods 68 and 69, respectively, are rollers 70 and 71 which are located on opposite sides of the longitudinal axis of the vehicle and are adapted to pass, respectively, under the ramps 72 and 73.

The rods 29 and 69, like the rods 28 and 38 in Figs. 3 and 4 should be resiliently extensible so as to insure proper operation of the lever arms 64 and 65 with the different vehicles required to travel over the route.

The ramps 72 and 73 may be supported much in the same manner as the ramps 36 and 45 in Figures 3 and 4. Further, they should be positioned in the proper heights to insure that as the vehicle passes thereunder, the actuator rods 68 and 69, respectively, will be depressed by the ramps 72 and 73, respectively.

Mounted on the shaft 61 are a pair of insulated movable contacts 74 and 75 which are connected to the opposite terminals of a suitable source of electrical energy such as a battery 76, for example. The movable contacts 74 and 75 are so positioned that when the shaft 61 is rotated in one direction they engage simultaneously the fixed contacts 77 and 78, respectively, and for rotation of the shaft 61 in the opposite direction they engage simultaneously the fixed contacts 79 and 80, respectively.

The fixed contacts 77 and 80 are both connected by a conductor 81 to one terminal of the motor 50 (Fig. 5). The other terminal of the motor 50 is connected by a conductor 82 to the fixed contacts 83 and 84 of a pair of normally closed limit switches 85 and 86 which are adapted to be actuated by the lever arm 55 at the extreme limits of its travel, respectively. The limit switch 86 has a second fixed contact 87 which is connected by a conductor 88 to the fixed contact 79 (Fig. 5A) and the limit switch 85 has a second fixed contact 89 which is connected by a conductor 90 to the fixed contact 78.

In Figs. 5 and 5A, the condition of the apparatus is that obtaining after the carriage 14 has been moved to the raised position. When the vehicle in its travel along the route reaches a location where the carriage 14 is to be lowered, the roller 70 (Fig. 5A) passes under the ramp 72 so that the actuator rod 68 is depressed and the shaft 61 is rotated to cause the movable contacts 74 and 75 thereon to engage the fixed contacts 79 and 80, respectively. This now energizes the motor 50 (Fig. 5) through a circuit which is traced from the positive terminal of the battery 76 through the movable contact 74 engaging the fixed contact 79, the conductor 88, the fixed contacts 87 and 84 engaging the movable contact 91 of the lower limit switch 86, the conductor 82, the motor 50, the conductor 81 and the fixed contact 80 (Fig. 5A) engaging the movable contact 75 to the negative terminal of the battery 76. The motor 50 now rotates in the proper direction to lower the carriage 14.

When the lever arm 55 (Fig. 5) reaches the lower limit of its travel, at which time the carriage 14 is properly seated in the groove 15 in the roadway, it opens the lower limit switch 86 and deenergizes the motor 50 so that the latter quickly comes to rest.

Raising of the carriage 14 at the proper time is accomplished in much the same manner by the passage of the roller 71 (Fig. 5A) under the ramp 73. This depresses the actuator rod 69 and brings the movable contacts 74 and 75 on the shaft 61 into engagement with the fixed contacts 77 and 78, respectively. An energizing circuit is now established for the motor 50 (Fig. 5) causing the latter to rotate in the proper direction to move the lever arm 55 upwardly and raise the carriage 14. At the upper limit of its travel, the lever arm 55 actuates the upper limit switch 85, breaking the energizing circuit so that the motor 50 quickly comes to rest.

While the portion of the equipment shown in Fig. 5A is described as being located on the roof 33 of the vehicle, this is not necessary and it will be understood that it could be placed below the floor of the vehicle. In such event, the actuator rods might be actuated by ramps placed either on the ground or at a low height therefrom.

In the form of the invention shown in Figs. 6 and 6A, pneumatic power means is employed for lifting the carriage 14 out of the guiding groove 15. The carriage raising mechanism comprises a vertical rod 92 having a forked member 93 at its lower end which is pivotally mounted on the bar 16 near the carriage 14. The rod 92 is slidably mounted in suitable guide means 94 secured on a transverse member 95 of the vehicle and it has a piston 96 secured at its upper end. The piston 96 is slidable in a cylinder 97 preferably fastened to a support member 98 secured below the floor (not shown) of the vehicle.

The portion of the cylinder 97 below the piston 96 communicates through a conduit 99 with a port 100 in a conventional pneumatic controller 101. The controller 101 also has a port 102 connected by a conduit 103 to a source of compressed air (not shown) and a port 104 communicating with a discharge vent 105. The port 100 is adapted to be placed selectively in communication with the conduit 103 and the discharge vent by a rotatable valve 106 having valve ports 107, 108 and 109. The valve 106 is adapted to be rotated by an arm 110 connected by a linkage 111 to an arm 112 secured on a shaft 113 journalled in bearings 114 and 115 supported on the vehicle side members.

Mounted at one end of the shaft 113 is a lever arm 116 on the end of which is pivotally mounted a forked member 117 formed at the lower end of a vertical actuator rod 118. The rod 118 is slidably mounted in guides 119 (Fig. 6A) provided in the floor (not shown) and in the roof 33 of the vehicle and it has at its upper end a laterally extending arm 120 carrying a roller 121 which is adapted to ride over a ramp 122 suitably mounted at a specified location along the route travelled by the vehicle. The actuator rod 118 is normally urged downwardly by a restoring spring 123 (Fig. 6) which is secured at one end to the fork member 117 and at its other end to the adjacent vehicle side member.

The carriage 14 is adapted to be retained releasably in the raised position by latching mechanism which may be the same as that shown in Figs. 3 and 4 and described in detail above.

In operation of the embodiment shown in Figs. 6 and 6A, upon arrival of the vehicle at the location of the ramp 122 (Fig. 6A), the roller 121 rides thereover lifting the actuator rod 118 and rotating the shaft 113 (Fig. 6) in the counterclockwise direction. This rotates the valve 106 of the controller 101 through the lever arms 112 and 113 and the linkage 111, putting the conduit 99 in communication with the conduit 103 which is connected to the compressed air supply. Air under pressure now enters the portion of the cylinder 97 below the piston 96 moving the latter upwardly and carrying with it the shaft 92 and the carriage 14. When the carriage 14 reaches the upper limit of its travel, the bar 16 is retained in this position by the detent portion 22 of the latch member 21 in the manner described above in connection with Fig. 1.

Upon leaving the ramp 122 (Fig. 6A), the roller 121 is pulled downwardly by the restoring spring 123 (Fig. 6). This acts to turn the valve 106 of the controller 101 to connect the conduit 99 to the discharge vent 105 so that when the latch member 21 is released, as described below, the carriage 14 will be free to drop of its own weight into the groove 15.

Upon arrival of the vehicle at a location where the carriage 14 is to be lowered, the roller 44 (Fig. 6A) will ride over the ramp 45 which will raise the actuator rod 38 releasing the latch member 21 and allowing the carriage 14 to drop into the groove 15.

Figure 7:
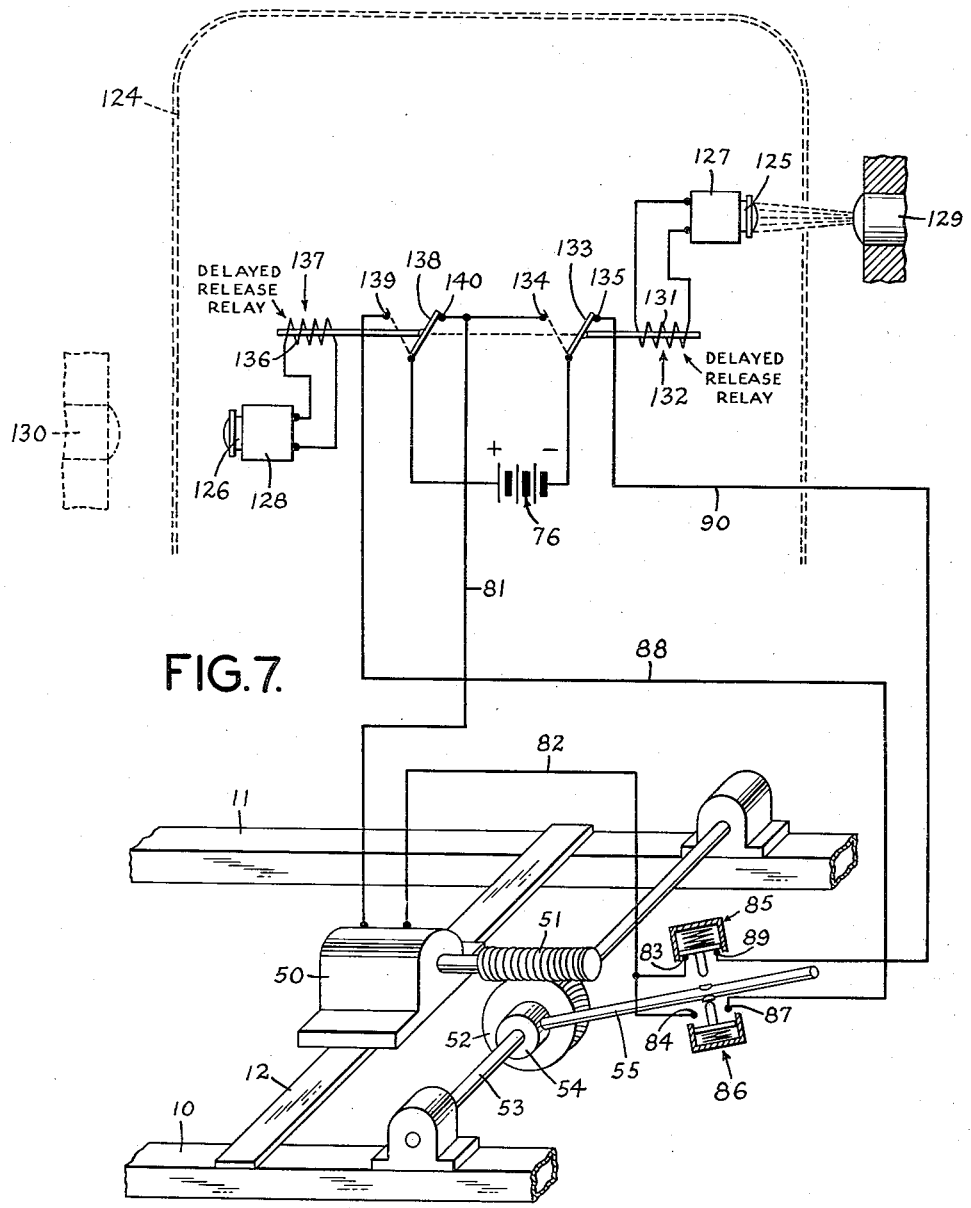
Fig. 7 illustrates schematically a further embodiment in which photoelectric means are employed to actuate the power means.

If desired, the latching mechanism in Fig. 6 could be eliminated by omitting the restoring spring 123 so as to leave the conduit 99 in communication with the compressed air inlet 103 after the actuator rod 118 has been lifted by the ramp 122. In this way, the air pressure beneath the piston 96 will retain the carriage 14 in its raised position. Lowering the carriage 14 could then be effected by mounting a lever arm on the opposite end of the shaft 113 from the lever arm 116 and connecting it to be actuated by a suitable vertical actuator cooperating with appropriate ramp means of the general character described above. This actuator would then serve to rotate the shaft 113 to connect the conduit 99 to the discharge vent 105 or to a restricted orifice designed to decelerate the descent of the carriage 14.

Where esthetic or other considerations make the use of mechanical actuator rods and ramps undesirable, photoelectric means may be used for actuating the mechanism which raises and lowers the carriage 14. Fig. 7 illustrates one way in which photoelectric actuator means of this character might be applied to a system like that in Fig. 5. In Fig. 7 is shown a vehicle 124 which may be a bus adapted to travel along a predetermined route. Mounted on opposite sides of the bus 124 are a pair of photoelectric devices 125 and 126 which are connected to conventional amplifiers 127 and 128. The photoelectric cells 125 and 126 are adapted to be energized by light from the sources 129 and 130 positioned on opposite sides of the bus 124 at locations along the route where the carriage 14 (Fig. 5) is to be raised and lowered, respectively.

Where the bus 124 has a driver's cab at one end only and is adapted to travel along a special two-way track, the photoelectric devices 125 and 126 should preferably be located at different heights, as should their respective light sources 129 and 130.

The output of the amplifier 127 is supplied to the winding 131 of a relay 132 having a movable contact 133 which is adapted to engage selectively one or the other of two fixed contacts 134 and 135. In similar fashion, the output of the amplifier 128 is connected to the winding 136 of a relay 137 having a movable contact 138 which is mechanically coupled to the movable contact 133 of the relay 132 and is adapted to engage selectively one or the other of the fixed contacts 139 and 140.

In Fig. 7, it is assumed that the carriage is down so that the lever arm 55 is at the bottom of its stroke, the upper and lower limit switches 85 and 86, respectively, being closed and open, respectively. The bus 124 has just passed the light source 129 and the relay contacts 138 and 133, respectively, have just been moved into engagement with the fixed contacts 140 and 135 as a result of energization of the relay winding 131 by the amplified pulse generated by the photoelectric cell 125.

A circuit is now completed which is traced from the positive terminal of the battery 76 through the movable contact 138 engaging the fixed contact 140 of the relay 137, the conductor 81, the motor 50, the conductor 82, the fixed contacts 83 and 89 engaging the movable contact of the limit switch 85, the conductor 90, and the fixed contact 135 engaging the movable contact 133 of the relay 132 to the negative terminal of the battery 76. This energizes the motor 50, causing it to raise the lever arm 55 and with it the carriage 14 (Fig. 5) until the motor 50 is deenergized by opening of the limit switch 85 at the upper limit of travel of the lever arm 55.

When the bus 124 passes the light source 130 at a location where the carriage should be lowered, an electrical pulse is generated by the photocell 126. This pulse, amplified by the amplifier 128, energizes the relay winding 136 and moves the movable contacts 138 and 133 of the relays 137 and 132, respectively, into engagement with the fixed contacts 139 and 134, respectively. A circuit is now closed which energizes the motor 50 in the direction to cause the lever arm 55 to move downwardly, lowering the carriage 14 (Fig. 5) with it until the motor 50 is deenergized by opening of the lower limit switch 86 at the lower limit of travel of the lever arm 55.

Since only brief pulses are produced by the photoelectric cells 125 and 126, the relays 137 and 132 should preferably be delayed in action so as to remain closed as long as the movement of the carriage 14 (Fig. 5) is not completed. As the electric circuit is automatically cut out at the end of the stroke of the carriage by the limit switches 85 or 86, the delay of the relay can be made sufficiently long in order to insure a margin of safety.

It is also possible in practice to use a rocker type relay having two armatures connected mechanically to each other in such fashion that when one armature is attracted by one of the coils of the rocker, the other is automatically placed in rest position, the respective positions of the armature being reversed when the second armature is attracted in its turn by the second coil of the rocker.

The invention thus provides novel and effective means for automatically controlling the position of a movable member on a vehicle in relation to track means therefor. By providing actuator means at each location along the route where the position of the movable member is required to be changed, together with mechanism on each vehicle which is adapted to be operated automatically by one of the actuator means as the vehicle arrives at the location of the latter, the desired change in position of the movable member may readily be effected automatically.

While the specific embodiments described above all involve the automatic positioning of the guide member of a bus or trolley-bus type vehicle relatively to a fixed track for the vehicle, it will be understood that the invention may be applied equally well to the automatic raising or lowering of the "plow" of an electric trolley car. In this application, it would avoid any damage in the event that the motorman should forget to raise the "plow" after having placed the trolley pole in position for energization of the car from an overhead cable system.

It is understood, of course, that the specific embodiments described above and shown in the drawings are merely illustrative and can be modified in detail within the spirit of the invention. For example, the carriage 14 could be replaced by any equivalent element such as a forked member adapted to engage a rail protruding from the ground. Further, inverted ramps of the type shown in Fig. 6A may be used interchangeably with ramps of the type shown in Figs. 3 and 5A, provided only that the proper actuator mechanism is employed as required to insure operation of the apparatus in the desired manner. The invention, therefore, is not to be limited to the specific structure disclosed herein but comprehends all modifications thereof falling within the scope of the appended claims.

I claim:

1. In apparatus for automatically controlling the position of a movable member on a vehicle in relation to track means therefor, the combination of mechanism on the vehicle and ramp means located along the route of the vehicle for raising said movable member, and means on said vehicle for retaining said movable member releasably in the raised position.

2. In apparatus for automatically controlling the position of a movable member on a vehicle in relation to track means therefor, the combination of mechanism on the vehicle and first ramp means located along the route of the vehicle for raising said movable member, means on said vehicle for retaining said movable member in the raised position, and means including second ramp means located along the route of the vehicle for actuating said retaining means to lower said movable member.

3. In apparatus for automatically controlling the position of a movable member on a vehicle in relation to track means therefor, the combination of ramp means disposed in the path of said movable member at a location along the route of the vehicle for raising said movable member, latch means on said vehicle for retaining said movable member releasably in the raised position, mechanism on the vehicle including actuatable means for releasing said latch means, and actuator means disposed along the path of the vehicle for automatically initiating operation of said actuatable means to release said latch means to enable said movable member to be lowered.

4. In apparatus for automatically controlling the position of a movable member on a vehicle in relation to track means therefor, the combination of means on said vehicle coupled to said movable member for lifting the same, means at a location along the route of the vehicle for actuating said lifting means to raise said movable member, latch means on said vehicle for retaining said movable member releasably in the raised position, actuator means on said vehicle for releasing said latch means to enable said movable member to be lowered, and initiator means disposed at a location along the route of the vehicle for actuating said actuator means to release said latch means.

5. In apparatus for automatically controlling the position of a movable member on a vehicle in relation to track means therefor, the combination of power means on the vehicle for altering the position of said movable member, control means on said vehicle for said power means and including actuatable means for operating said control means, and actuator means disposed at a location along the route of said vehicle and adapted to cooperate with said actuatable means to operate said control means to alter the position of said movable member.

6. In apparatus for automatically controlling the position of a movable member on a vehicle in relation to track means therefor, the combination of reversible power means on the vehicle for raising and lowering said movable member, control means on said vehicle for said power means and including first and second actuatable means for operating said control means to raise and lower said movable member, respectively, and first and second actuator means disposed at locations along the route of said vehicle and adapted to actuate said first and second actuatable means, respectively, to operate the same.

7. In apparatus for automatically controlling the position of a movable member on a vehicle in relation to track means therefor, the combination of reversible electric power means on the vehicle for raising and lowering said movable member, control circuit means on said vehicle including two-position switching means for operating said power means, first and second actuatable means on the vehicle for controlling the position of said switching means, and first and second actuator means disposed at locations along the route of said vehicle and adapted to actuate said first and second actuatable means, respectively, to operate the same.

8. In apparatus for automatically controlling the position of a movable member on a vehicle in relation to track means therefor, the combination of pneumatic power means on the vehicle for altering the position of said movable member, pneumatic control means on said vehicle for said power means having a controller and actuatable means for operating said controller, and actuator means disposed at a location along the route of said vehicle and adapted to actuate said actuatable means to operate the same.

9. In apparatus for automatically controlling the position of a movable member on a vehicle in relation to track means therefor, the combination of pneumatic power means on the vehicle for raising said movable member, pneumatic controller means on said vehicle for said power means having a controller, means on said vehicle for retaining said movable member releasably in the raised positon, first and second actuatable means on said vehicle for releasing said retaining means and for operating said controller, respectively, and first and second actuator means disposed at locations along the route of the vehicle and adapted to actuate said first and second actuatable means, respectively, to operate the same.

10. In apparatus for automatically controlling the position of a movable member on a vehicle in relation to track means therefor, the combination of pneumatic power means on said vehicle for raising said movable member, pneumatic control means on said vehicle for energizing and deenergizing said power means and having a controller for operating the same, first and second actuatable means on said vehicle for operating said controller selectively to energize and deenergize said power means, respectively, and first and second actuator means disposed at locations along the route of the vehicle for selectively operating said actuatable means, respectively.

11. In apparatus for automatically controlling the position of a movable member on a vehicle in relation to track means therefor, the combination of reversible pneumatic power means on said vehicle for raising and lowering said movable member, respectively, pneumatic control means on said vehicle for energizing said power means to raise and lower said movable member, and having a controller for operating the same, first and second actuatable means on said vehicle for operating said controller selectively to energize said power means for rotation in opposite directions, respectively, and first and second actuator means disposed at locations along the route of the vehicle for selectively operating said actuatable means, respectively.

12. In apparatus for automatically controlling the position of a movable member on a vehicle in relation to track means therefor, the combination of photoelectric means on the vehicle, light source means disposed at a location along the route over which the vehicle is to travel, and mechanism on the vehicle and responsive to said photoelectric means for altering the poistion of said movable member.

13. In apparatus for automatically controlling the position of a movable member on a vehicle in relation to track means therefor, the combination of mechanism on said vehicle for altering the position of said movable member, electric power means on said vehicle for said position altering mechanism, electric control circuit means including photoelectric means connected with and for controlling said electric power means, and light source means disposed along the route over which the vehicle is to travel for activating said photoelectric means.

14. In apparatus for automatically controlling the position of a movable member on a vehicle in relation to track means therefor, the combination of mechanism on said vehicle for selectively raising and lowering said movable member, electric power means on said vehicle for said mechanism, electric control circuit means connected with said power means and including first and second photoelectric means activatable selectively to cause opertaion of said electric power means to raise or lower said movable member, and first and second light source means disposed at locations along the route over which the vehicle is to travel for selectively activating said first and second photoelectric means, respectively.

15. In apparatus for automatically controlling the position of a movable member on a vehicle in relation to track means therefor, the combination of mechanism for altering the position of said movable member, electrically operated controller means on said vehicle for said mechanism, electric control circuit means on said vehicle electrically connected to said controller means and including photoelectric means activatable to cause operation of said controller means, and light source means disposed at a location along the route over which the vehicle is to travel for activating said photoelectric means.

16. In apparatus for automatically controlling the position of a movable member on a vehicle in relation to track means therefor, the combination of mechanism on said vehicle for altering the position of said movable member, electrically operated controller means on said vehicle for said position altering mechanism, electric control circuit means on said vehicle electrically connected to said controller means and including first photoelectric means activatable to cause operation of said controller means, means on said vehicle for locking said movable means releasably in a given position, electric control circuit means on said vehicle electrically connected to said locking means and including second photoelectric means activatable to cause said locking means to be released, and first and second light source means disposed at locations along the route over which the vehicle is to travel for selectively activating said first and second photoelectric means, respectively.

17. In apparatus for automatically controlling the position of a movable member on a vehicle in relation to track means therefor, the combination of mechanism on said vehicle for raising and lowering said movable member, reversible rotary motor means on said vehicle for operating said mechanism, electrically operated controller means on said vehicle for said motor means, electric control circuit means on said vehicle electrically connected to said controller means and including first and second photoelectric means selectively actuatable to operate said controller means to raise and lower said movable member, and first and second light source means disposed at locations along the route over which the vehicle is to travel for selectively actuating said first and second photoelectric means, respectively.

18. A device for automatically controlling the raising or lowering of a movable member on a vehicle which moves along a given path in order to place this member respectively out of operation or into operation, comprising in combination a first lever carrying said movable member and pivotally mounted on said vehicle for movement between a raised position and a lowered position around an axis transverse to the vehicle, a first vertical rod articulated to said first lever between the pivot axis thereof and the movable member, a reversible motor connected to said rod for raising it, a horizontal shaft rotatably mounted on said vehicle, a second lever fixed to said shaft, a second vertical rod articulated to said second lever, a first roller borne by said second rod, a first ramp along the path of said vehicle engageable with said first roller to raise and lower said second rod and rotate said shaft, and means on said vehicle actuated by rotation of said shaft for energizing said motor to raise said first rod and said movable member.

19. A device according to claim 18, comprising a worm and worm gear reducing train driven by the motor, a fourth lever rigidly connected with said worm gear and movable in a vertical plane containing the first lever and a sliding pivot connection between said fourth lever and the first vertical rod.

20. A device according to claim 18, comprising a third lever fixed to said horizontal shaft and extending therefrom in the direction opposite said second lever, so that the first roller cooperating with the first ramp causes the horizontal shaft to turn in one direction, a second ramp along the path of said vehicle, a third vertical rod articulated to said third lever and a second roller carried by said third rod and cooperating with the second ramp to rotate the horizontal shaft in the opposite direction to lower the movable member.

21. A device according to claim 18, in which said vertical second and third rods are resiliently extensible and contractible.

22. A device according to claim 18, comprising means on said vehicle to lock the first lever in said raised position.

23. A device according to claim 22, in which the means for locking the movable member in said raised position comprises a fifth lever having a stepped longitudinal profile, a spring urging said lever into engagement with said first lever to immobilize the latter in said raised position, releasing means connected with said fifth lever for moving it out of engagement with said first lever with ramp means along the path of said vehicle for actuating said releasing means to disengage the end of the first lever.

24. A device according to claim 18, in which the motor is an electric motor.

25. A device according to claim 24, in which said means for energizing said motor comprises two sets of electrical contacts, two contact blades movable with said horizontal shaft and connected respectively to the two terminals of a source of electric current and said motor for alternate engagement with said contacts to control the rotation of the motor.

26. A device according to claim 24, in which said means for energizing said motor comprises a first electric circuit between the motor and a source of electrical energy including a first switch actuated by said shaft which opens when said first lever is in said raised position and a second circuit including a second switch actuated by said shaft which opens when said lever is in said lower position.

27. A device according to claim 18, in which the motor is a fluid pressure motor.

28. A device according to claim 27, in which the means for energizing said motor comprises a source of fluid pressure connected to said motor, a valve actuated by said shaft for controlling the flow of fluid from said source to said motor in response to rotation of said shaft.

References Cited in the file of this patent

UNITED STATES PATENTS

| | | |
|---|---|---|
| 1,000,106 | Morris | Aug. 8, 1911 |
| 1,638,228 | Wolff | Aug. 9, 1927 |
| 2,068,403 | Ekstrom | Jan. 19, 1937 |
| 2,468,158 | Bartholomew | Apr. 26, 1949 |
| 2,619,370 | Leger | Nov. 25, 1952 |
| 2,619,916 | Ranier | Dec. 2, 1952 |
| 2,635,555 | Hansson | Apr. 21, 1953 |
| 2,655,872 | Templeton | Oct. 20, 1953 |

FOREIGN PATENTS

| | | |
|---|---|---|
| 1,142,512 | France | Feb. 3, 1956 |
| 102,385 | Great Britain | Mar. 29, 1917 |